United States Patent
He (10) Patent No.: US 10,859,494 B2
(45) Date of Patent: Dec. 8, 2020

(54) TRANSMITTANCE MEASURING METHOD, DEVICE AND COMPUTER READABLE STORAGE MEDIUM

(71) Applicants: Chongqing HKC Optoelectronics Technology Co., Ltd., Chongqing (CN); HKC Corporation Limited, Guangdong (CN)

(72) Inventor: Yang He, Chongqing (CN)

(73) Assignees: Chongqing HKC Optoelectronics Technology Co., Ltd., Chongqing (CN); HKC Corporation Limited, Shenzhen (CN)

(*) Notice: Subject to any disclaimer, the term of this patent is extended or adjusted under 35 U.S.C. 154(b) by 68 days.

(21) Appl. No.: 16/241,121

(22) Filed: Jan. 7, 2019

(65) Prior Publication Data
US 2020/0072749 A1 Mar. 5, 2020

Related U.S. Application Data

(63) Continuation of application No. PCT/CN2018/111532, filed on Oct. 24, 2018.

(30) Foreign Application Priority Data

Sep. 3, 2018 (CN) .......................... 2018 1 1024525

(51) Int. Cl.
*G01N 21/59* (2006.01)
*G02F 1/1335* (2006.01)
*G02F 1/13357* (2006.01)

(52) U.S. Cl.
CPC ....... *G01N 21/59* (2013.01); *G02F 1/133528* (2013.01); *G02F 1/133602* (2013.01); *G01N 2201/121* (2013.01)

(58) Field of Classification Search
CPC ........ G02F 1/133602; G02F 1/133528; G01N 21/59; G01N 2201/121; G01M 11/00; G01M 11/0285; G01M 11/0207; G01M 11/0257; G01M 11/0228; G01B 11/255; G02B 6/266
See application file for complete search history.

(56) References Cited

U.S. PATENT DOCUMENTS

| | | | | |
|---|---|---|---|---|
| 4,490,612 A | * | 12/1984 | Tormala | G01N 21/3563 250/339.06 |
| 4,617,080 A | * | 10/1986 | Kobayashi | B44C 1/1712 156/359 |
| 5,108,174 A | * | 4/1992 | Lippens | G01M 11/0228 356/124 |

(Continued)

FOREIGN PATENT DOCUMENTS

| | | |
|---|---|---|
| CN | 104181129 A | 12/2014 |
| CN | 104237128 A | 12/2014 |

(Continued)

*Primary Examiner* — Sang H Nguyen (57) ABSTRACT

Disclosed are a transmittance measuring method, which includes the following operations: acquiring the initial transmittance of a polarizer to be measured at a measuring point; acquiring a transmittance correction value corresponding to the measuring point; determining the transmittance of the polarizer to be measured according to the initial transmittance and the transmittance correction value corresponding to the measuring point.

18 Claims, 8 Drawing Sheets

(56) References Cited

U.S. PATENT DOCUMENTS

| | | | |
|---|---|---|---|
| 6,577,387 B2* | 6/2003 | Ross, III | G01B 11/255 356/124 |
| 2002/0085285 A1* | 7/2002 | Aoki | G02B 6/266 359/618 |
| 2002/0131038 A1* | 9/2002 | Akiyama | G01M 11/0285 356/124 |
| 2005/0179863 A1* | 8/2005 | Taguchi | G02C 7/02 351/159.39 |
| 2007/0193343 A1* | 8/2007 | Liberatore | G01N 11/14 73/54.33 |
| 2007/0273870 A1* | 11/2007 | Divo | G01M 11/0228 356/124 |
| 2008/0165350 A1 | 7/2008 | Huang et al. | |
| 2012/0092740 A1* | 4/2012 | Kimura | G02B 26/127 359/204.1 |
| 2013/0171349 A1* | 7/2013 | Takahashi | C23C 14/54 427/255.23 |
| 2013/0306872 A1* | 11/2013 | Paulson | B41F 23/0456 250/341.8 |
| 2015/0292978 A1* | 10/2015 | Suzuki | G01M 11/0221 356/124 |

FOREIGN PATENT DOCUMENTS

| | | |
|---|---|---|
| CN | 104777085 A | 7/2015 |
| CN | 106969906 A | 7/2017 |

* cited by examiner

TRANSMITTANCE MEASURING METHOD, DEVICE AND COMPUTER READABLE STORAGE MEDIUM

CROSS REFERENCE TO RELATED APPLICATIONS

The present application is a Continuation Application of PCT Application No. PCT/CN2018/111532 filed on Oct. 24, 2018, which claims the benefit of Chinese Patent Application No. 201811024525.3 filed on Sep. 3, 2018. All the above are hereby incorporated by reference.

TECHNICAL FIELD

The present application relates to the technical field of display, in particular, to a transmittance measuring method, a transmittance measuring device, and a computer-readable storage medium.

BACKGROUND

In the field of display technology, polarizers have an important influence on the optical performance of the panel, such as transmittance, brightness, contrast, viewing angle, chroma, hue, etc., especially the transmittance of the panel has always been the focus of attention in the field of display. Polarizers are mainly made of PVA film, TAC film, protective film, release film and pressure sensitive adhesive, etc. In addition, many surface treatments such as anti-glare treatment (AG), anti-reflective treatment (AR), cleaning and hard coating (CHC) and so on. Thus it is of great significance to screen a polarizer with high transmittance among many polarizer structures.

Known Measurement Techniques:

At present, the commonly used method to verify the transmittance of polarizer is to select the position of the measuring point and then successively attach different test samples to compare the transmittance of different polarizer samples. When we successively attach to measure the transmittance of the polarizer, the measurement results are easily influenced, to some degree, by backlight brightness fluctuation, bending caused by manual change of OC, alignment deviation of measurement points, etc., which not only results in a large measurement error but also consumes a vast of time and reduces the accuracy of transmittance measurement.

To sum up, the current transmittance measuring method is greatly influenced by other factors, resulting in a large transmittance error and poor accuracy.

SUMMARY

The main purpose of the application is to provide a transmittance measuring method, a device and a computer-readable storage medium, aiming to solve the problems that the current transmittance measuring method is greatly influenced by other factors, resulting in large transmittance error and poor accuracy.

In order to achieve the above object, the present application provides a transmittance measuring method, which includes the following steps:

acquiring an initial transmittance of an optical film to be measured at a measuring point;

acquiring a transmittance correction value corresponding to the measuring point; and determining a transmittance of the optical film to be measured according to the initial transmittance and the transmittance correction value corresponding to the measuring point.

Optionally, before the operation of acquiring an initial transmittance of an optical film to be measured at a measuring point, the method further includes:

acquiring a transmittance of an optical film to be measured at each measuring point;

determining a transmittance of a reference measuring point in each measuring point; and comparing transmittance of other measuring points with the transmittance of the reference measuring point, calculating a transmittance correction value of each measuring point, wherein, the other measuring points are measuring points other than the reference measuring point.

Optionally, before the operation of comparing transmittance of other measuring points with the transmittance of the reference measuring point, calculating a transmittance correction value of each measuring point, wherein, the other measuring points are measuring points other than the reference measuring point, the method further includes:

determining position information and backlight information of each measuring point;

determining transmittance trend information corresponding to each measuring point according to the position information and backlight information;

judging whether the transmittance of each measuring point is consistent with the transmittance trend information; and comparing the transmittance of other measuring points with the transmittance of the reference measuring point, for calculating and obtaining the transmittance correction value of each measuring point, if the transmittance of each measuring point is consistent with the transmittance trend information.

Optionally, when a plurality of optical films are to be measured, the operation of determining a transmittance of the optical film to be measured according to the initial transmittance and the transmittance correction value corresponding to the measuring point, includes:

comparing the transmittance of each of the plurality of optical films to be measured, and obtaining a difference value of the transmittance of each of the plurality of optical films to be measured, after transmittance of the plurality of optical films is measured.

Optionally, before the operation of acquiring an initial transmittance of an optical film to be measured at a measuring point, the method further includes:

determining backlight information corresponding to each measuring point;

calculating a difference value between the backlight information of each measuring point and the backlight information of the reference measuring point; and generating a first transmittance correction value for each measuring point according to the difference value.

Optionally, after the operation of generating a first transmittance correction value for each measuring point according to the difference value, the method further includes:

acquiring a transmittance of an optical film to be measured at each measuring point;

determining a transmittance of a reference measuring point in each measuring point; and comparing transmittance of other measuring points with the transmittance of the reference measuring point, calculating a transmittance correction value of each measuring point, wherein, the other measuring points are measuring points other than the reference measuring point, and determining the transmittance correction value corresponding to each measuring point, according to the first transmittance correction value and the second transmittance correction value regarding each measuring point.

Optionally, the operation of determining the transmittance correction value corresponding to each measuring point, according to the first transmittance correction value and the second transmittance correction value regarding each measuring point, includes:

comparing whether a trend of the first transmittance correction value and a trend of the second transmittance correction value is the same, after the first transmittance correction value and the second transmittance correction value are calculated and obtained; and if different, retrieving the first transmittance correction value and the second transmittance correction value;

if the same, calculating the transmittance correction value of the measuring point according to the first transmittance correction value and the second transmittance correction value.

Optionally, before the operation of acquiring an initial transmittance of an optical film to be measured at a measuring point, the method further includes:

providing an optical measuring device, placing the optical film to be measured within a measuring region of the optical measuring device and placing the optical film to be measured at each measuring point; and controlling the optical measuring device for measuring the transmittance of the optical film at each measuring point.

Optionally, the operation of controlling the optical measuring device for measuring the transmittance of the optical film at each measuring point, includes:

controlling the optical measuring device for measuring a light intensity passing through the optical film at each measuring point; and determining transmittance of a corresponding optical film according to each light intensity.

Additionally, in order to achieve the above object, the present application also provides a transmittance measuring device, wherein, the transmittance measuring device includes: a memory, a processor and a computer program stored in the memory and executable on the processor. When the computer program is executed by the processor, the steps of the method as described above are implemented.

Additionally, in order to achieve the above object, the present application also provides a computer-readable storage medium, wherein, a transmittance measurement program is stored on the computer-readable storage medium, when the transmittance measurement program is executed by a processor, the steps of the transmittance measuring method described above are implemented.

According to the invention, the initial transmittance of the optical film is measured first to obtain the transmittance correction value in advance, and the initial transmittance of different test points is corrected through the correction value, so that the transmittance measurement of the optical film reduces errors caused by backlight fluctuation and alignment deviation and improves the accuracy of the optical film measurement.

The implementation, functional features and advantages of the purpose of this application will be further described with reference to the accompanying drawings in conjunction with the exemplary embodiments.

DETAILED DESCRIPTION OF THE EMBODIMENTS

It should be understood that the specific exemplary embodiments described herein are only for the purpose of explaining the present application and are not intended to limit the present application.

The main solution of the exemplary embodiment of the application: acquiring an initial transmittance of an optical film to be measured at a measuring point; acquiring a transmittance correction value corresponding to the measuring point; and determining a transmittance of the optical film to be measured according to the initial transmittance and the transmittance correction value corresponding to the measuring point.

As the current transmittance measuring method is greatly influenced by other factors, leading to the problems of large transmittance error and poor accuracy. According to the solution provided by the application, the initial transmittance of the optical film is measured first to obtain a transmittance correction value which is preset in advance, and the initial transmittance of different measuring points are corrected by the correction value, so that the transmittance measurement of the optical film reduces errors caused by backlight fluctuation and alignment deviation and improves the accuracy of the measurement of the optical film.

Figure 1:
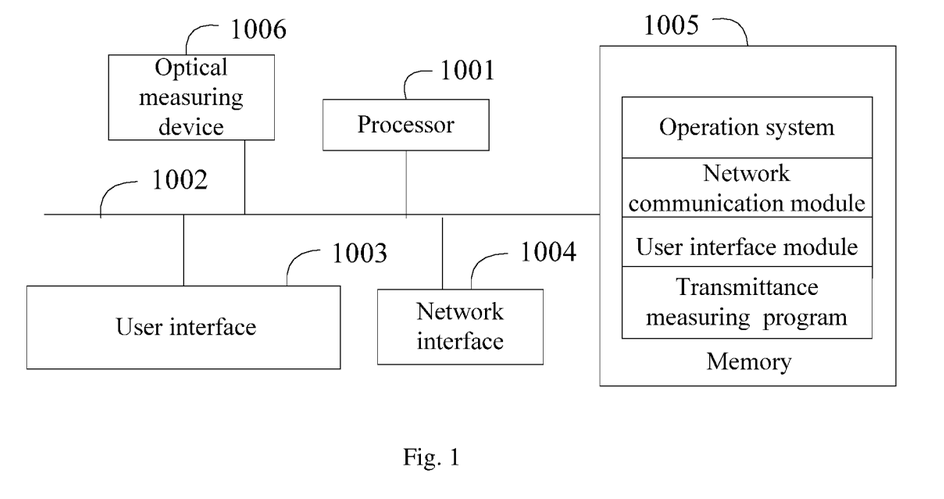
FIG. 1 is a schematic structural diagram of a measuring device of hardware operation environment involved in an exemplary embodiment of the present application.

As shown in FIG. 1, which is a schematic structural diagram of a measuring device for hardware operation environment involved in an exemplary embodiment of the present application.

As shown in FIG. 1, the measuring device may include a processor 1001, such as a CPU, a network interface 1004, a user interface 1003, a memory 1005, and a communication bus 1002. In which the communication bus 1002 is arranged to enable communication between these components. The user interface 1003 may include a display, an input unit such as a keyboard, and the optional user interface 1003 may also include a standard wired interface and a wireless interface. The network interface 1004 may optionally include a standard wired interface and a wireless interface (such as a WiFi interface). The memory 1005 may be a high-speed RAM memory or a non-volatile memory, such as a disk memory. The memory 1005 may Optionally be a memory device separate from the aforementioned processor 1001.

Optionally, the measuring device may also include a camera, a radio frequency circuit, a sensor, an audio circuit, a WiFi module, a detector (optical measurement sensor 1006), and the like.

It will be understood by those skilled in the art that the terminal structure shown in FIG. 1 does not constitute a limitation on the measuring device. The measuring device may include more or fewer components than shown, or some components may be combined, or different component arrangements may be used. The measuring device may be a display device, such as a liquid crystal display device, or a device with a display function and/or a processing function such as a mobile phone, pad or television.

As shown in FIG. 1, a memory 1005 as a computer readable storage medium may include an operating system, a network communication module, a user interface module, and a transmittance measurement application program.

In the terminal shown in FIG. 1, the network interface 1004 is mainly set to connect with the background server and communicate data with the background server. The user interface 1003 is mainly set up to connect the client (client) and communicate data with the client. The processor 1001 may be configured to call the transmittance measurement application stored in the memory 1005 and perform the following operations:

acquiring an initial transmittance of an optical film to be measured at a measuring point;

acquiring a transmittance correction value corresponding to the measuring point; and determining a transmittance of the optical film to be measured according to the initial transmittance and the transmittance correction value corresponding to the measuring point.

Further, before the operation of acquiring the initial transmittance of the optical film to be measured at the measuring point, the processor 1001 may be configured to call the transmittance measurement application stored in the memory 1005 and perform the following operations:

acquiring a transmittance of an optical film to be measured at each measuring point;

determining a transmittance of a reference measuring point in each measuring point; and comparing transmittance of other measuring points with the transmittance of the reference measuring point, calculating a transmittance correction value of each measuring point, wherein, the other measuring points are measuring points other than the reference measuring point.

Further, the processor 1001 may be configured to call the transmittance measurement application stored in the memory 1005, before the operation of comparing transmittance of other measuring points with the transmittance of the reference measuring point, calculating a transmittance correction value of each measuring point, wherein, the other measuring points are measuring points other than the reference measuring point, the method further comprises:

determining position information and backlight information of each measuring point;

determining transmittance trend information corresponding to each measuring point according to the position information and backlight information;

judging whether the transmittance of each measuring point is consistent with the transmittance trend information; and comparing the transmittance of other measuring points with the transmittance of the reference measuring point, for calculating and obtaining the transmittance correction value of each measuring point, if the transmittance of each measuring point is consistent with the transmittance trend information.

Further, when a plurality of optical films are to be measured, the operation of determining a transmittance of the optical film to be measured according to the initial transmittance and the transmittance correction value corresponding to the measuring point, comprises:

comparing the transmittance of each of the plurality of optical films to be measured, and obtaining a difference value of the transmittance of each of the plurality of optical films to be measured, after transmittance of the plurality of optical films is determined.

Further, before the operation of acquiring an initial transmittance of an optical film to be measured at a measuring point, the processor 1001 may be configured to call the transmittance measurement application stored in the memory 1005 and implement the following operations:

determining backlight information corresponding to each measuring point;

calculating a difference value between the backlight information of each measuring point and the backlight information of the reference measuring point; and generating a first transmittance correction value for each measuring point according to the difference value.

Further, after the operation of generating a first transmittance correction value for each measuring point according to the difference value, the processor 1001 may be configured to call the transmittance measurement application stored in the memory 1005 and perform the following operations:

acquiring a transmittance of an optical film to be measured at each measuring point;

determining a transmittance of a reference measuring point in each measuring point; and comparing transmittance of other measuring points with the transmittance of the reference measuring point, calculating a transmittance correction value of each measuring point, wherein, the other measuring points are measuring points other than the reference measuring point, and determining the transmittance correction value corresponding to each measuring point, according to the first transmittance correction value and the second transmittance correction value regarding each measuring point.

Further, before the operation of acquiring an initial transmittance of an optical film to be measured at a measuring point, the processor 1001 may be configured to call the transmittance measurement application stored in the memory 1005 and perform the following operations:

providing an optical measuring device, placing the optical film to be measured within a measuring region of the optical measuring device and placing the optical film to be measured at each measuring point; and controlling the optical measuring device for measuring the transmittance of the optical film at each measuring point.

Further, the processor 1001 may be configured to call the transmittance measurement application stored in the memory 1005 and perform the following operations:

controlling the optical measuring device for measuring a light intensity passing through the optical film at each measuring point; and determining transmittance of a corresponding optical film according to each light intensity.

Figure 2:
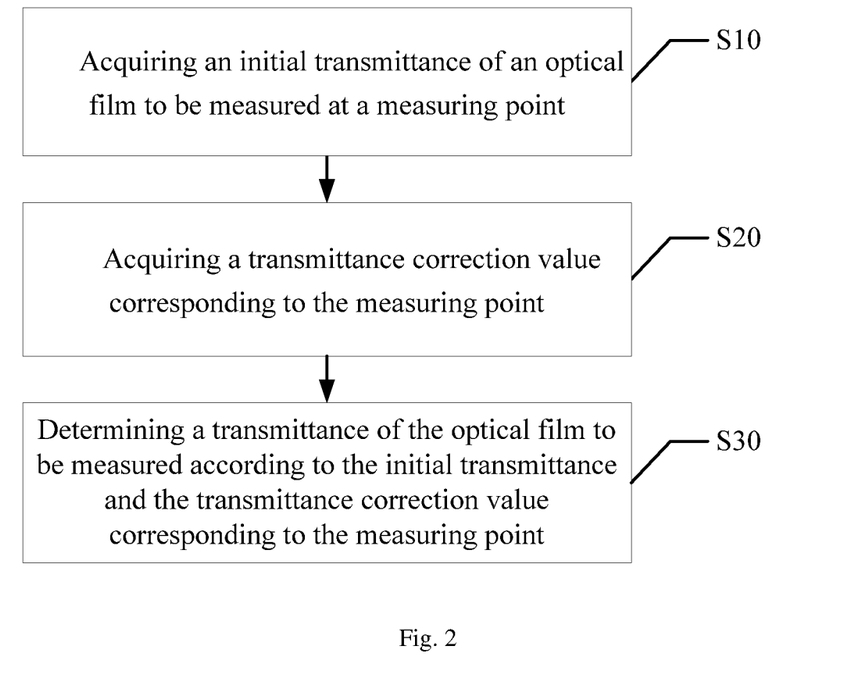
FIG. 2 is a flow chart of an exemplary embodiment of the transmittance measuring method of the present application.

Referring to FIG. 2, an exemplary embodiment of the present application provides a transmittance measuring method, which includes:

step S10, acquiring an initial transmittance of an optical film to be measured at a measuring point.

In the present exemplary embodiment, the initial transmittance is the transmittance directly measured by the optical measuring device, that is, the initial transmittance is the transmittance directly read from the measurement of the optical measuring device.

Before measuring the transmittance of the optical film, a plurality of measuring points are preset in advance, each measuring point can be provided with a different optical film, and of course, the transmittance of one optical film can also be measured through the plurality of measuring points. The optical film can be selected as a polarizer, which is arranged for the display device and deflects the light incident on the liquid crystal to further control the deflection of the liquid crystal.

Specifically, the optical measuring device measures the transmittance of the optical film by: providing an optical measuring device, placing the optical film to be measured within a measuring region of the optical measuring device and placing the optical film to be measured at each measuring point; and controlling the optical measuring device for measuring the transmittance of the optical film at each measuring point. The transmittance of the corresponding optical film is determined according to the intensity of each light intensity. The transmittance of the optical film is determined according to the light intensity before and after passing through the optical film, and the transmittance is obtained by how much light the optical film absorbs.

Step S20, acquiring a transmittance correction value corresponding to the measuring point.

Each measuring point is provided with a transmittance correction value, and the correction value between different measuring points will be set according to the actual situation to be different transmittance correction values, and the correction value may be a negative correction value or a positive correction value. The influence of the correction value is mainly caused by the backlight fluctuation of the measuring point or by the different light received at different positions. After measuring the initial transmittance of the optical film at a plurality of measuring points in step S10, according to the relationship between the measuring points preset in advance and the transmittance correction value, the transmittance correction value is determined corresponding to the measuring point where the initial transmittance is currently measured, which means, the transmittance correction value corresponding to the measuring point where the optical film is placed, needs to be obtained.

Whereas, in an exemplary embodiment of the present application, the operation of acquiring the transmittance correction value of the measuring point may be performed first. That is, whether to acquire the transmittance correction value of the measuring point is determined by measuring whether the measuring point has placed an optical film, and after acquiring the transmittance correction value, or at the same time, the initial transmittance of the optical film to be measured is acquired at the measuring point.

Step S30, determining a transmittance of the optical film to be measured according to the initial transmittance and the transmittance correction value corresponding to the measuring point.

After obtaining the initial transmittance of the measuring point and the transmittance correction value corresponding to the measuring point, the transmittance of the optical film to be measured is determined according to the initial transmittance and the transmittance correction value corresponding to the measuring point. That is, the initial transmittance and the transmittance correction value are summed to calculate the transmittance of the optical film at the measuring point. The correction value of transmittance has positive and negative values, positive values means plus and negative values means minus. After determining the transmittance of the plurality of optical films to be measured, the measured transmittance of each of the optical films to be measured are compared to obtain the different values of the transmittance of each of the optical films to be measured. The transmittance of each optical film can be quickly measured, so that the transmittance of each optical film can be accurately compared, and the optical film with high transmittance among the optical films can be quickly selected.

According to the exemplary embodiment, the initial transmittance of the optical film is first measured to obtain the transmittance correction value set in advance, and the initial transmittance of different measuring points is corrected through the correction value, so that the transmittance measurement of the optical film reduces errors caused by backlight fluctuation and alignment deviation and improves the accuracy of the optical film measurement.

Figure 3:
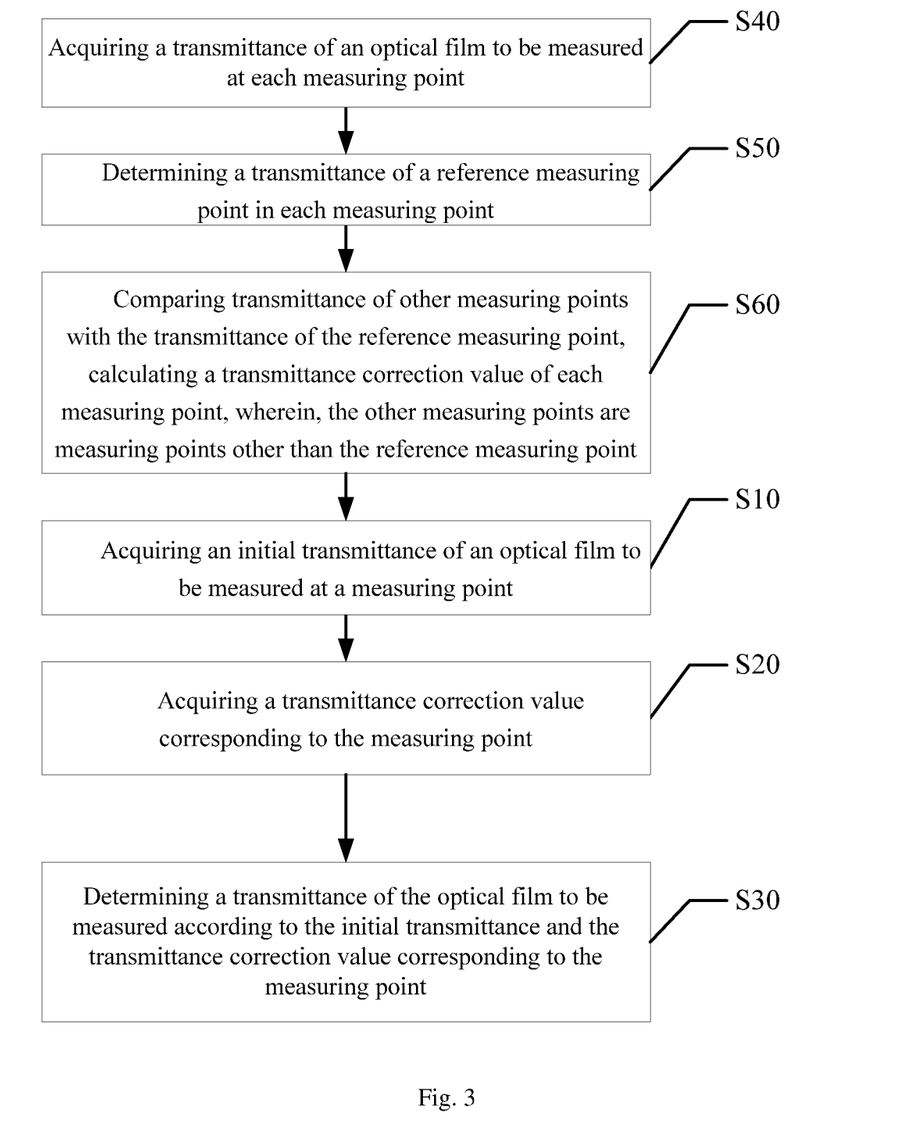
FIG. 3 is a flow chart of another exemplary embodiment of the transmittance measuring method of the present application.

In one exemplary embodiment, referring to FIG. 3, before the operation of acquiring the initial transmittance of the optical film to be measured at the measuring point, the method further includes:

step S40, acquiring a transmittance of an optical film to be measured at each measuring point;

step S50, determining a transmittance of a reference measuring point in each measuring point;

step S60, comparing transmittance of other measuring points with the transmittance of the reference measuring point, calculating a transmittance correction value of each measuring point, wherein, the other measuring points are measuring points other than the reference measuring point.

Figure 4:
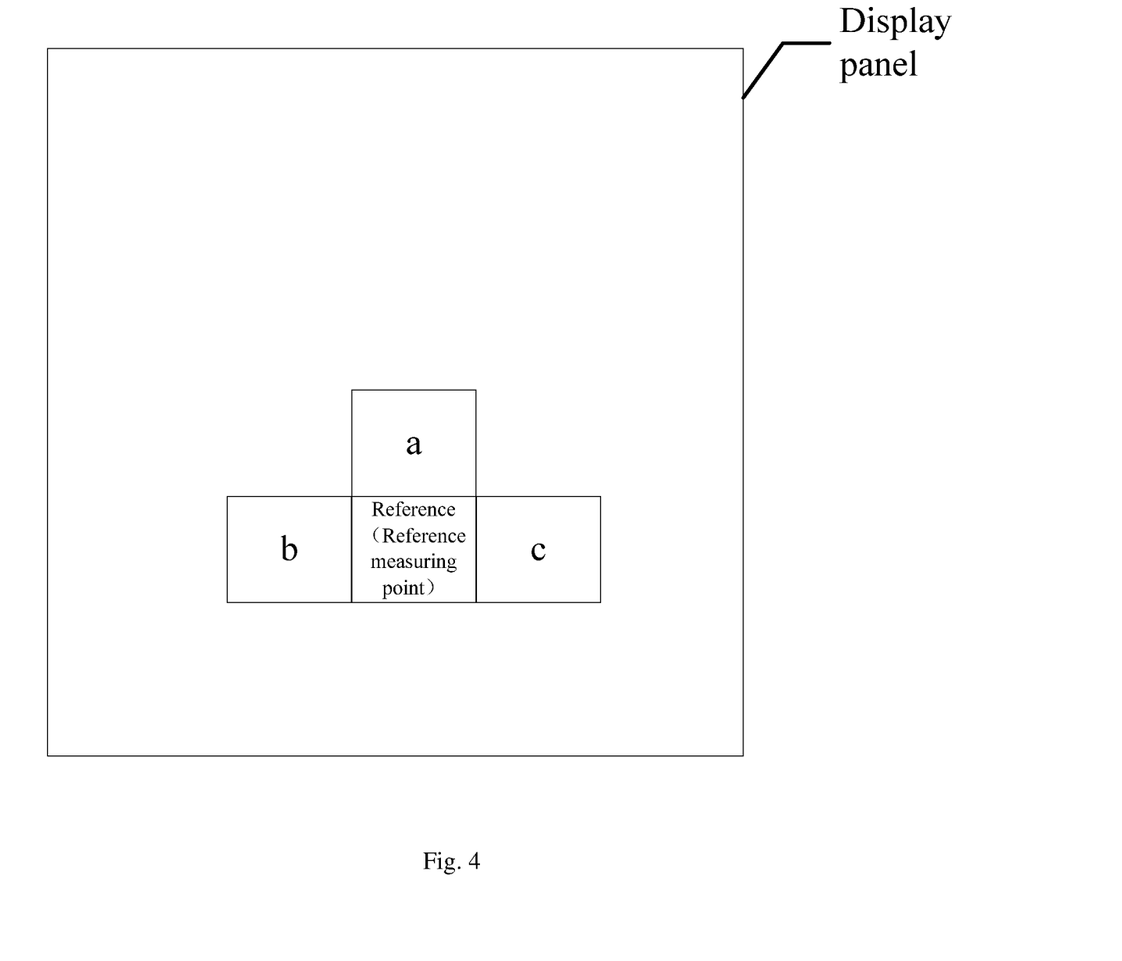
FIG. 4 is a schematic diagram of distribution of measuring points in an exemplary embodiment of the present application.

In this exemplary embodiment, the transmittance correction value of the optical film at each measuring point will be preset or stored in advance. One way of presetting the correction value is as follows:

First, a piece of optical film is placed at the measurement position, and a reference measuring point and other measuring points are set. That is, the position of the measuring point (as shown in FIG. 4) is firstly determined, and the transmittance tra, trb, trc and tr0 of the four measuring points of the optical film sample a, b, c and reference (reference measuring point) before being attached are measured respectively. According to the measurement results, taking TR0 as the reference, difference between the other measuring points and the reference, i.e. the compensation values, are calculated respectively as da, db and dc.

In the present exemplary embodiment, the transmittance of a plurality of measuring points is measured by an optical film. The transmittance difference of other measuring points is calculated by selecting a reference measuring point to obtain a transmittance correction value, so that the provision of the correction value is more reasonable and the accuracy of the test is improved.

Figure 5:
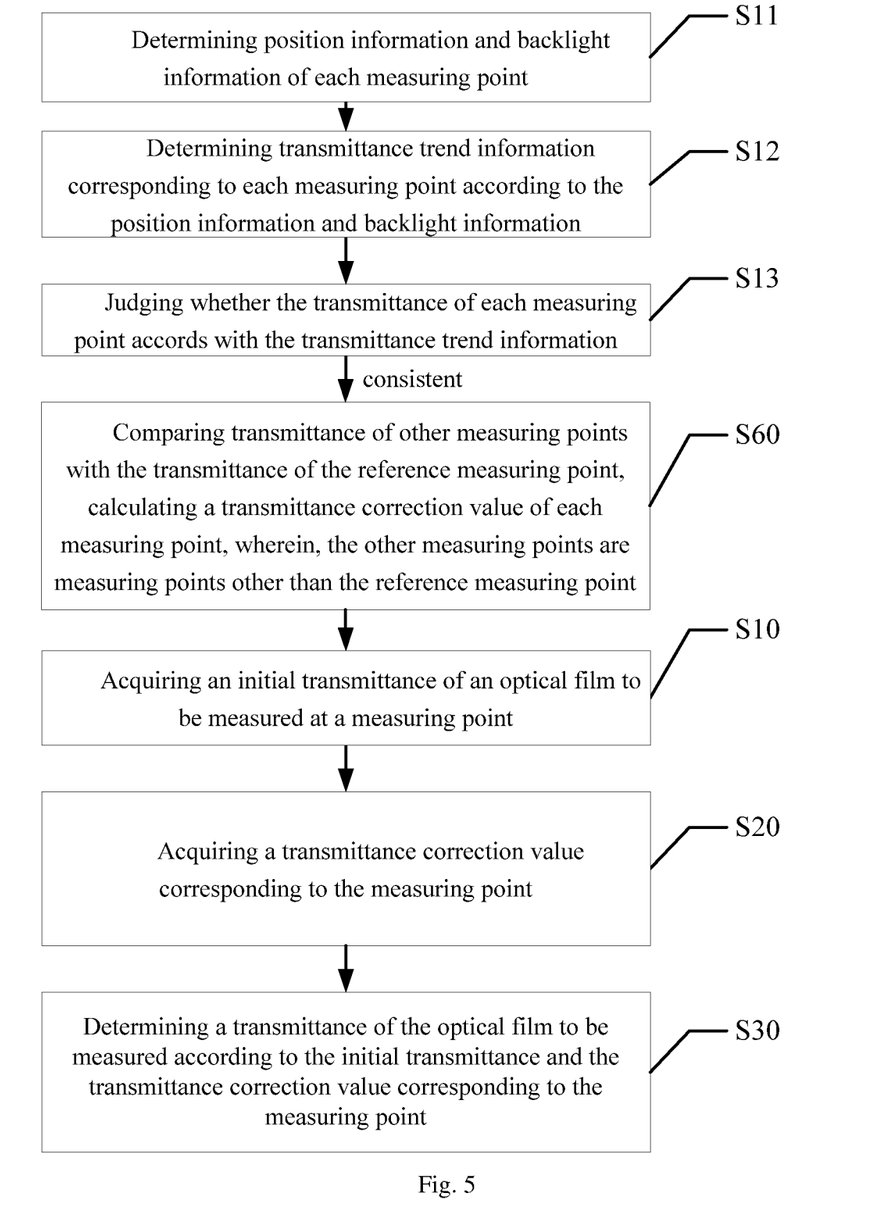
FIG. 5 is a flow chart of another exemplary embodiment of the transmittance measuring method of the present application.

In order to obtain the correction value more accurately, referring to FIG. 5, before the step of comparing the transmittance of other measuring points with the transmittance of the reference measuring point, calculating and obtaining the transmittance correction value of each measuring point, wherein the other measuring points are measuring points other than the reference measuring point, the method further includes:

step S11, determining position information and backlight information of each measuring point;

step S12, determining transmittance trend information corresponding to each measuring point according to the position information and backlight information;

step S13, judging whether the transmittance of each measuring point is consistent with the transmittance trend information; and comparing the transmittance of other measuring points with the transmittance of the reference measuring point, for calculating and obtaining the transmittance correction value of each measuring point, if the transmittance of each measuring point is consistent with the transmittance trend information.

The transmittance of the optical film has a relationship with backlight information, besides the structure of the optical film in nature. When the transmittance is measured, the position information and backlight information of each measuring point are determined, the position and backlight information of each measuring point are obtained. The backlight intensity is obtained, and it is obtained whether backlight intensity is different at different positions. The transmittance trend information corresponding to each measuring point is thus determined according to the position information and backlight information. That is, it is also obtained that whether the light intensity before passing through the optical film is different at different positions. If the light intensity is different, resulting in different measured transmittance trends. For example, before passing through the optical film, the light intensity at position A is greater than that at position B, the transmittance at position A should be greater than that at position B for the same optical film. Therefore, according to this, trend of transmittance is available. If the measured transmittance is not consistent this trend, it is determined that the measuring result is invalid and it is necessary to re-measure the transmittance of the optical film. If the trend is consistent, the measurement result is determined to be valid, and a step of comparing the transmittance of other measuring points with the transmittance of the reference measuring points is performed to calculate and obtain the transmittance correction value of each measuring point. Through the acquisition of backlight information, the transmittance trend of measuring points is analyzed to obtain the transmittance trend, so as to avoid the error of correction value and to improve the measurement accuracy.

Figure 6:
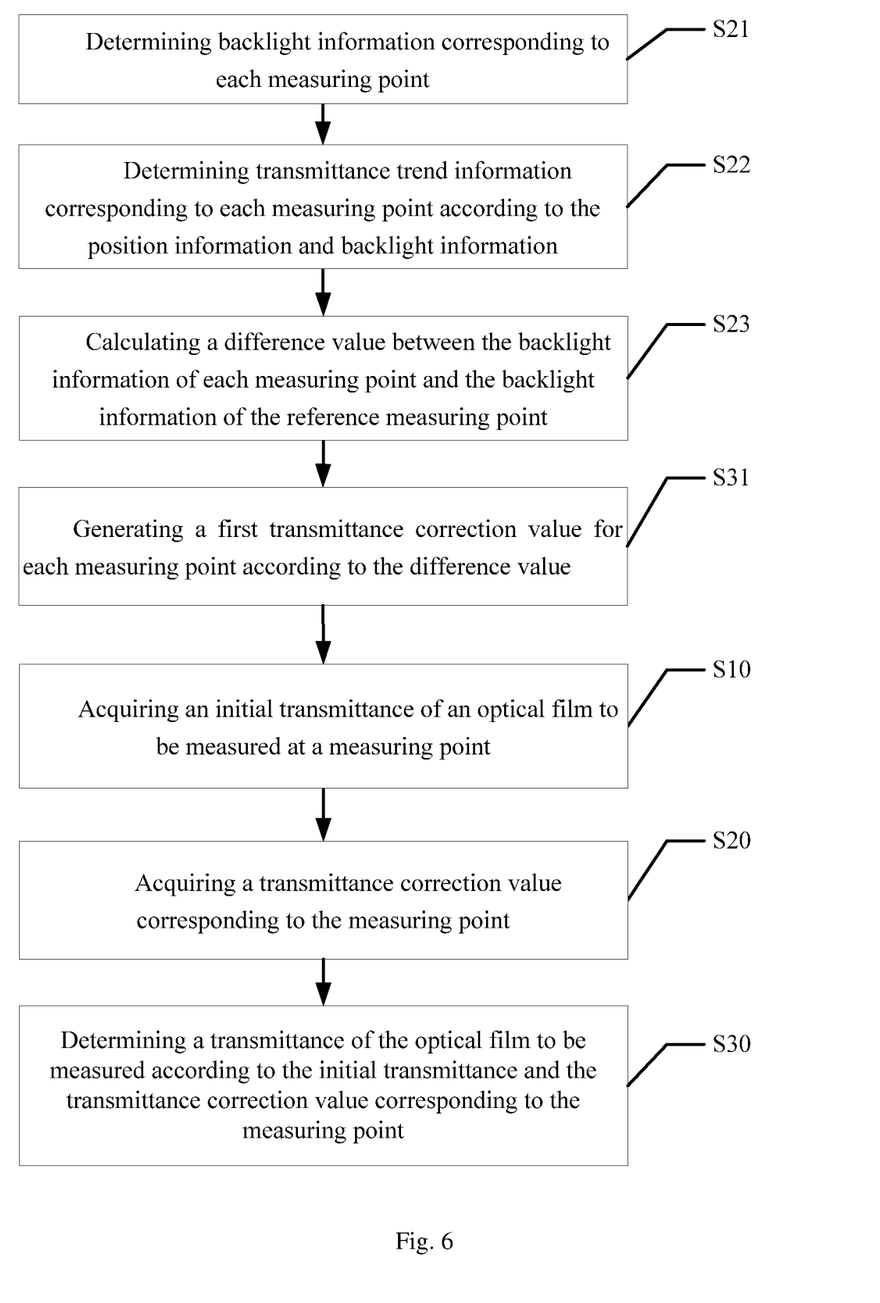
FIG. 6 is a flow chart of another exemplary embodiment of the transmittance measuring method of the present application.

In one exemplary embodiment, referring to FIG. 6, before the step of acquiring the initial transmittance of the optical film to be tested at the measuring point, the method further includes:

step S21, determining backlight information corresponding to each measuring point;

step S22, calculating a difference value between the backlight information of each measuring point and the backlight information of the reference measuring point;

step S23, generating a first transmittance correction value for each measuring point according to the difference value.

In the present exemplary embodiment, backlight is the factor influencing the transmittance non-uniformality of the optical film, and correction is needed for the backlight difference. The transmittance correction value between different backlights is preset in advance to correct the transmittance difference caused by different backlights at different measuring points. Specifically, the backlight information corresponding to each measuring point is determined, and the difference between the backlight information of each measuring point and the backlight information of the reference measuring point is calculated, and the first transmittance correction value of each measuring point is generated according to the difference. In fact, the first transmittance correction value in this exemplary embodiment is the transmittance correction value determined in step S20, and the corresponding step S30 is modified to determine the transmittance of the optical film to be tested according to the initial transmittance and the first transmittance correction value. At the place where the backlight is weak, the corresponding transmittance should be increased and positive correction should be made. At the place where the backlight is strong, the corresponding correction value is to decrease the transmittance and make negative correction. Through the correction of different backlight positions, the transmittance accuracy of each measuring point is higher, and then the optical film with more appropriate transmittance can be selected.

Figure 7:
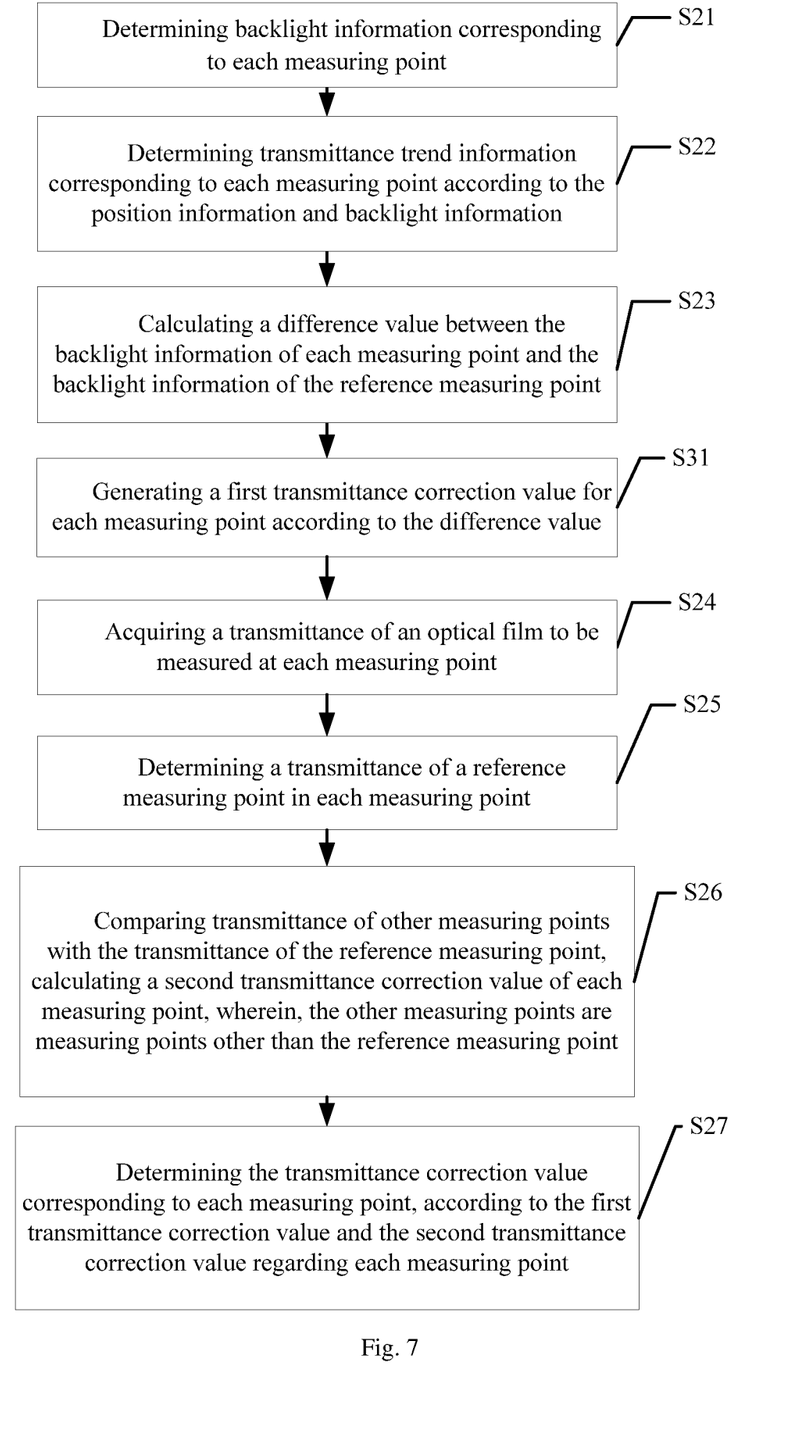
FIG. 7 is a flow chart of another exemplary embodiment of the transmittance measuring method of the present application.

In order to obtain the correction values of the transmittance of the optical film at different measuring points more accurately, referring to FIG. 7, the step of generating the first transmittance correction values of each measuring point according to the difference further includes:

step S24, acquiring a transmittance of an optical film to be measured at each measuring point;

step S25, determining a transmittance of a reference measuring point in each measuring point;

step S26, comparing transmittance of other measuring points with the transmittance of the reference measuring point, calculating a second transmittance correction value of each measuring point, wherein, the other measuring points are measuring points other than the reference measuring point;

step S27, determining the transmittance correction value corresponding to each measuring point, according to the first transmittance correction value and the second transmittance correction value regarding each measuring point.

In this exemplary embodiment, after the first transmittance correction value of the measuring point is obtained through backlight information, the second transmittance correction value is also obtained according to the difference between a piece of optical film at different measuring points and the reference measuring point. The transmittance correction value of the measuring point is calculated according to the first transmittance correction value and the second transmittance correction value. It can be weighted or averaged to obtain the transmittance correction value.

Further, it is compared whether a trend of the first transmittance correction value and a trend of the second transmittance correction value is the same, after the first transmittance correction value and the second transmittance correction value are calculated and obtained. If it is different, the first transmittance correction value and the second transmittance correction value are retrieved. If it is the same, the transmittance correction value of the measuring point is calculated according to the first transmittance correction value and the second transmittance correction value, to avoid the calculation error of the transmittance correction value and to improve the accuracy of the transmittance correction value.

Figure 8:
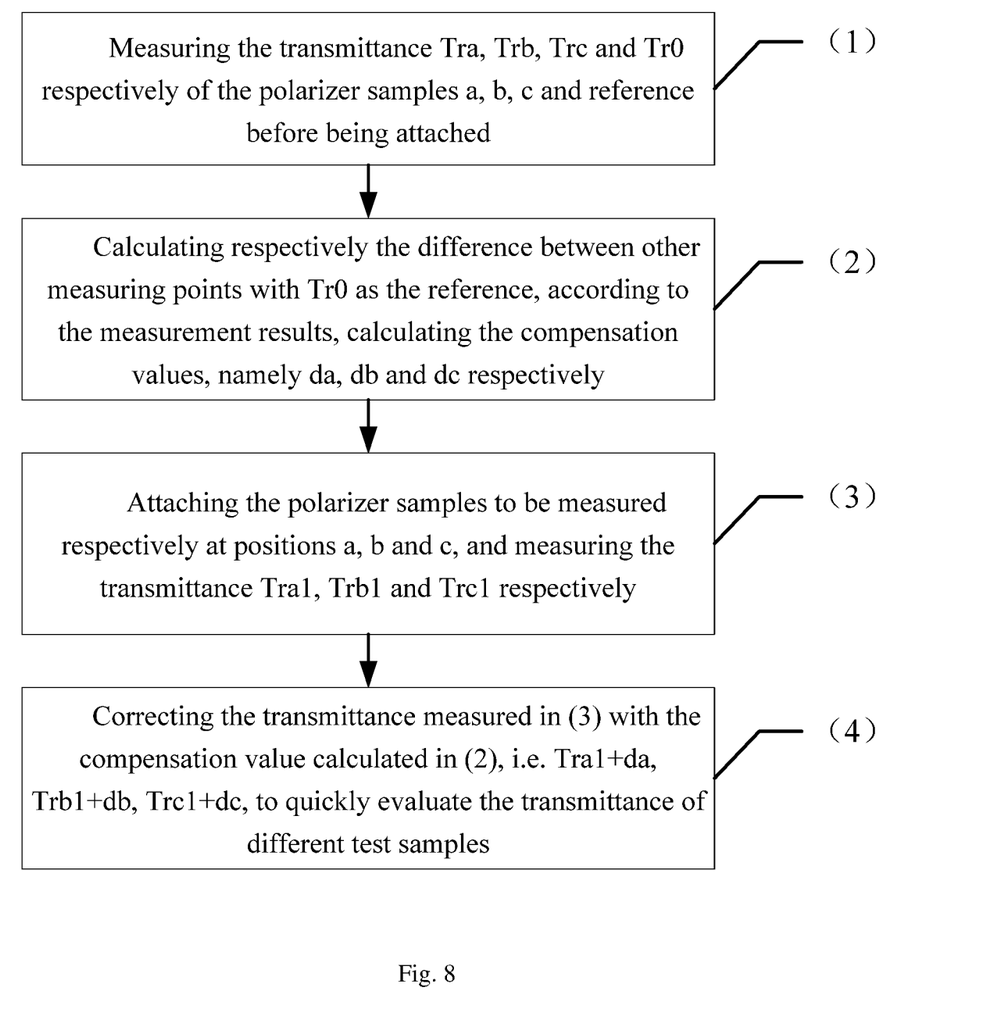
FIG. 8 is a flow chart showing comparison of the transmittance of each optical film in an exemplary embodiment of the present application.

In order to better describe the exemplary embodiments of the present application, taking polarizers as an example, referring to FIG. 8, the way of comparing the transmittance of a plurality of polarizers includes:

(1) determining first the positions of the measuring points, and measuring the transmittance Tra, Trb, Trc and Tr0 respectively of the polarizer samples a, b, c and reference before being attached;

(2) calculating respectively the difference between other measuring points with Tr0 as the reference, according to the measurement results, which is, calculating the compensation values, namely da, db and dc respectively;

(3) attaching the polarizer samples to be measured respectively at positions a, b and c, and measuring the transmittance Tra1, Trb1 and Trc1 respectively;

(4) correcting the transmittance measured in (3) with the compensation value calculated in (2), i.e. Tra1+da, Trb1+db, Trc1+dc, to quickly evaluate the transmittance of different test samples.

Additionally, the exemplary embodiment of the present application further provides a computer-readable storage medium. A transmittance measurement program is stored on the computer-readable storage medium. When the transmittance measurement program is executed by the processor, the steps of the transmittance measuring method described above are implemented.

It should be noted that in the present application, the terms "comprising", "including" or any other variation thereof, are intended to cover a non-exclusive inclusion, such that a process, method, article, or system that includes a series of elements including not only those elements but also other elements not expressly listed, or elements inherent to such process, method, article, or system. Without further limitation, the element defined by the statement "including one . . . " does not exclude the existence of another identical element in the process, method, article or system that includes the element.

The above-mentioned serial numbers of the exemplary embodiments of the present application are for the purpose of description only and do not represent the superiority or inferiority of the exemplary embodiments.

From the description of the above exemplary embodiments, it will be clear to those skilled in the art that the method of the above exemplary embodiments can be implemented by means of software with a necessary general-purpose hardware platform. Although it can also be implemented by hardware, in many cases the former is a better exemplary embodiment. Based on this understanding, the technical solution of the present application, in nature or part of the contribution to the prior art, may be embodied in the form of a software product stored in a computer-readable storage medium (such as ROM/RAM, diskette, CD) as described above, including several instructions to cause a terminal device (which may be a mobile phone, computer, server, air conditioner, or network device, etc.) to perform the methods described in various exemplary embodiments of the present application.

The above is only the preferred exemplary embodiment of the present application, and therefore is not limiting the scope of the patent application. Any equivalent structure or equivalent process transformation made by using the contents of the specification and drawings of the present application, or directly or indirectly applied in other related technical fields, should similarly be included in the protection scope of the present application.

What is claimed is:

1. A transmittance measuring method, applied to an optical measuring device and implemented by a transmittance measuring device, wherein, the transmittance measuring method comprises:

acquiring a transmittance of a piece of optical film to be measured at each measuring point of the optical measuring device;

determining a transmittance of a reference measuring point at each measuring point of the optical measuring device;

comparing transmittance of other measuring points with the transmittance of the reference measuring point, calculating a transmittance correction value of each measuring point of the optical measuring device, wherein, the other measuring points are measuring points of the optical measuring device other than the reference measuring point;

acquiring an initial transmittance of an optical film to be measured at a measuring point of the optical measuring device;

acquiring the transmittance correction value corresponding to the measuring point of the optical measuring device; and determining a transmittance of the optical film to be measured according to the initial transmittance and the transmittance correction value corresponding to the measuring point of the optical measuring device, thereby reducing errors caused by backlight fluctuation and alignment deviation of the optical measuring device through the transmittance of the optical film to be measured corrected by the transmittance correction value.

2. The method of claim 1, wherein, before the operation of comparing transmittance of other measuring points with the transmittance of the reference measuring point, calculating a transmittance correction value of each measuring point of the optical measuring device, wherein, the other measuring points are measuring points of the optical measuring device other than the reference measuring point, the method further comprises:

determining position information and backlight information of each measuring point of the optical measuring device;

determining transmittance trend information corresponding to each measuring point of the optical measuring device according to the position information and backlight information;

judging whether the transmittance of each measuring point of the optical measuring device is consistent with the transmittance trend information; and comparing the transmittance of other measuring points with the transmittance of the reference measuring point, for calculating and obtaining the transmittance correction value of each measuring point of the optical measuring device, if the transmittance of each measuring point of the optical measuring device is consistent with the transmittance trend information.

3. The method of claim 2, wherein, when a plurality of optical films are to be measured, the operation of determining a transmittance of the optical film to be measured according to the initial transmittance and the transmittance correction value corresponding to the measuring point of the optical measuring device, comprises:

comparing the transmittance of each of the plurality of optical films to be measured, and obtaining a difference value of the transmittance of each of the plurality of optical films to be measured, after transmittance of the plurality of optical films is determined.

4. The method of claim 1, wherein, before the operation of acquiring an initial transmittance of an optical film to be measured at a measuring point of the optical measuring device, the method further comprises:

providing an optical measuring device, placing the optical film to be measured within a measuring region of the optical measuring device and placing the optical film to be measured at each measuring point of the optical measuring device; and controlling the optical measuring device for measuring the transmittance of the optical film at each measuring point of the optical measuring device.

5. The method claim 1, wherein, when a plurality of optical films are to be measured, the operation of determining a transmittance of the optical film to be measured according to the initial transmittance and the transmittance correction value corresponding to the measuring point of the optical measuring device, comprises:

comparing the transmittance of each of the plurality of optical films to be measured, and obtaining a difference value of the transmittance of each of the plurality of optical films to be measured, after transmittance of the plurality of optical films is measured.

6. The method of claim 1, wherein, when a plurality of optical films are to be measured, the operation of determining a transmittance of the optical film to be measured according to the initial transmittance and the transmittance correction value corresponding to the measuring point of the optical measuring device, comprises:

comparing the transmittance of each of the plurality of optical films to be measured, and obtaining a difference value of the transmittance of each of the plurality of optical films to be measured, after transmittance of the plurality of optical films is measured.

7. The method of claim 1, wherein before the operation of acquiring an initial transmittance of an optical film to be measured at a measuring point of the optical measuring device, the method further comprises:

determining backlight information corresponding to each measuring point of the optical measuring device;

calculating a difference value between the backlight information of each measuring point of the optical measuring device and the backlight information of the reference measuring point of the optical measuring device; and generating a first transmittance correction value for each measuring point of the optical measuring device according to the difference value.

8. The method of claim 7, wherein, after the operation of generating a first transmittance correction value for each measuring point of the optical measuring device according to the difference value, the method further comprises:

acquiring transmittance of a piece of optical film to be measured at each measuring point of the optical measuring device;

determining a transmittance of a reference measuring point in each measuring point of the optical measuring device; and comparing transmittance of other measuring points with the transmittance of the reference measuring point, calculating a transmittance correction value of each measuring point of the optical measuring device, wherein, the other measuring points are measuring points of the optical measuring device other than the reference measuring point, and determining the transmittance correction value corresponding to each measuring point of the optical measuring device, according to the first transmittance correction value and the second transmittance correction value regarding each measuring point of the optical measuring device.

9. The method of claim 7, wherein, after the operation of generating a first transmittance correction value for each measuring point of the optical measuring device according to the difference value, the method further comprises:

acquiring a transmittance of an optical film to be measured at each measuring point of the optical measuring device;

determining a transmittance of a reference measuring point in each measuring point of the optical measuring device; and comparing transmittance of other measuring points with the transmittance of the reference measuring point, calculating a transmittance correction value of each measuring point of the optical measuring device, wherein, the other measuring points are measuring points of the optical measuring device other than the reference measuring point;

after the operation of generating a first transmittance correction value for each measuring point of the optical measuring device according to the difference value, the method further comprises:

determining the transmittance correction value corresponding to each measuring point of the optical measuring device, according to the first transmittance correction value and the second transmittance correction value regarding each measuring point of the optical measuring device.

10. The method of claim 7, wherein, the operation of determining the transmittance correction value corresponding to each measuring point of the optical measuring device, according to the first transmittance correction value and the second transmittance correction value regarding each measuring point of the optical measuring device, comprises:

comparing whether a trend of the first transmittance correction value and a trend of the second transmittance correction value is the same, after the first transmittance correction value and the second transmittance correction value are calculated and obtained; and if different, retrieving the first transmittance correction value and the second transmittance correction value;

if the same, calculating the transmittance correction value of the measuring point of the optical measuring device according to the first transmittance correction value and the second transmittance correction value.

11. The method of claim 1, wherein, before the operation of acquiring an initial transmittance of an optical film to be measured at a measuring point of the optical measuring device, the method further comprises:

providing the optical measuring device, placing the optical film to be measured within a measuring region of the optical measuring device and placing the optical film to be measured at each measuring point of the optical measuring device; and controlling the optical measuring device for measuring the transmittance of the optical film at each measuring point of the optical measuring device.

12. The method of claim 11, wherein the operation of controlling the optical measuring device for measuring the transmittance of the optical film at each measuring point of the optical measuring device, comprises:

controlling the optical measuring device for measuring a light intensity passing through the optical film at each measuring point of the optical measuring device; and determining transmittance of a corresponding optical film according to each light intensity.

13. A transmittance measuring device, wherein, the transmittance measuring device comprises a non-transitory memory, a processor and a computer program stored in the non-transitory memory and executable on the processor, when the computer program is executed by the processor, the following steps are implemented:

acquiring a transmittance of a piece of optical film to be measured at each measuring point of the optical measuring device;

determining a transmittance of a reference measuring point at each measuring point of the optical measuring device;

comparing transmittance of other measuring points with the transmittance of the reference measuring point, calculating a transmittance correction value of each measuring point of the optical measuring device, wherein, the other measuring points are measuring points of the optical measuring device other than the reference measuring point;

acquiring an initial transmittance of an optical film to be measured at a measuring point of an optical measuring device;

acquiring the transmittance correction value corresponding to the measuring point of the optical measuring device; and     determining a transmittance of the optical film to be measured according to the initial transmittance and the transmittance correction value corresponding to the measuring point of the optical measuring device, thereby reducing errors caused by backlight fluctuation and alignment deviation of the optical measuring device through the transmittance of the optical film to be measured corrected by the transmittance correction value.

14. The device of claim 13, wherein, the transmittance measuring device is a display device.

15. The device of claim 13, wherein when the computer program is executed by the processor, the following steps are implemented:

determining position information and backlight information of each measuring point of the optical measuring device;

determining transmittance trend information corresponding to each measuring point of the optical measuring device according to the position information and backlight information;

judging whether the transmittance of each measuring point of the optical measuring device is consistent with the transmittance trend information; and     comparing the transmittance of other measuring points with the transmittance of the reference measuring point, for calculating and obtaining the transmittance correction value of each measuring point of the optical measuring device, if the transmittance of each measuring point of the optical measuring device is consistent with the transmittance trend information.

16. The device of claim 13, wherein, when the computer program is executed by the processor, the following steps are implemented:

determining backlight information corresponding to each measuring point of the optical measuring device;

calculating a difference value between the backlight information of each measuring point of the optical measuring device and the backlight information of the reference measuring point of the optical measuring device;

generating a first transmittance correction value for each measuring point of the optical measuring device according to the difference value.

17. The device of claim 16, wherein, when the computer program is executed by the processor, the following steps are implemented:

acquiring a transmittance of an optical film to be measured at each measuring point of the optical measuring device;

determining a transmittance of a reference measuring point in each measuring point of the optical measuring device; and     comparing transmittance of other measuring points with the transmittance of the reference measuring point, calculating a transmittance correction value of each measuring point of the optical measuring device, wherein, the other measuring points are measuring points of the optical measuring device other than the reference measuring point, and     determining the transmittance correction value corresponding to each measuring point of the optical measuring device, according to the first transmittance correction value and the second transmittance correction value regarding each measuring point of the optical measuring device.

18. A non-transitory computer-readable storage medium, wherein, a transmittance measurement program is stored on the non-transitory computer-readable storage medium, when the transmittance measurement program is executed by a processor, the following steps are implemented:

acquiring a transmittance of a piece of optical film to be measured at each measuring point of the optical measuring device;

determining a transmittance of a reference measuring point at each measuring point of the optical measuring device;

comparing transmittance of other measuring points with the transmittance of the reference measuring point, calculating a transmittance correction value of each measuring point of the optical measuring device, wherein, the other measuring points are measuring points of the optical measuring device other than the reference measuring point;

acquiring an initial transmittance of an optical film to be measured at a measuring point of an optical measuring device;

acquiring the transmittance correction value corresponding to the measuring point of the optical measuring device; and     determining a transmittance of the optical film to be measured according to the initial transmittance and the transmittance correction value corresponding to the measuring point of the optical measuring device, thereby reducing errors caused by backlight fluctuation and alignment deviation of the optical measuring device through the transmittance of the optical film to be measured corrected by the transmittance correction value.

\* \* \* \* \*